United States Patent [19]
Cook-Hellberg

[11] Patent Number: 5,937,052
[45] Date of Patent: Aug. 10, 1999

[54] ANONYMOUS CALL REJECTION OVERRIDE

[75] Inventor: Karen Cook-Hellberg, Plano, Tex.

[73] Assignee: Ericsson Inc., Research Triangle Park, N.C.

[21] Appl. No.: 08/802,046

[22] Filed: Feb. 18, 1997

[51] Int. Cl.[6] .............................. H04M 1/56; H04M 3/00; H04M 3/42

[52] U.S. Cl. ..................... 379/219; 379/245; 379/142; 379/196; 379/211

[58] Field of Search ..................................... 379/242, 245, 379/246, 219, 229, 188, 196, 197, 198, 142, 201, 211

[56] References Cited

U.S. PATENT DOCUMENTS

| | | | |
|---|---|---|---|
| 5,033,076 | 7/1991 | Jones et al. | 379/67 |
| 5,161,181 | 11/1992 | Zwick | 379/245 |
| 5,309,508 | 5/1994 | Rosen | 379/245 |
| 5,341,414 | 8/1994 | Popke | 379/142 |
| 5,412,711 | 5/1995 | Hayashi | 379/196 |
| 5,426,693 | 6/1995 | Rosen | 379/245 |
| 5,467,388 | 11/1995 | Reed, Jr. et al. | 379/196 |
| 5,521,969 | 5/1996 | Paulus et al. | 379/142 |
| 5,590,184 | 12/1996 | London | 379/142 |
| 5,737,403 | 4/1998 | Zave | 379/211 |
| 5,781,613 | 7/1998 | Knuth et al. | 379/373 |

FOREIGN PATENT DOCUMENTS

| | | |
|---|---|---|
| 0 437 256 | 1/1991 | European Pat. Off. . |
| WO 91/09483 | 6/1991 | WIPO . |
| WO 93/19555 | 9/1993 | WIPO . |

OTHER PUBLICATIONS

PCT International Search Report, Oct. 19, 1998, PCT/US 98/02938.

*Primary Examiner*—Harry S. Hong
*Assistant Examiner*—Benny Q. Tieu
*Attorney, Agent, or Firm*—Jenkens & Gilchrist

[57] ABSTRACT

An Address Presentation Restricted Indicator within an Initial Address Message (IAM) call setup signal includes a value indicating that a requested call connection is an emergency call. In response, even if the terminating subscriber has an Anonymous Call Rejection (ACR) subscriber feature activated, the terminating end office overrides the activated feature and effectuates a call connection towards the terminating subscriber without displaying the directory number associated with the originating subscriber. A memory register associated with a CLASS Automatic Recall (CAR) subscriber feature is further not updated with the incoming directory number to preclude a call back to the originating subscriber from the terminating subscriber.

21 Claims, 3 Drawing Sheets

| 8 | 7 | 6 | 5 | 4 | 3 | 2 | 1 |
|---|---|---|---|---|---|---|---|
| 1 | Odd/Even | Nature of Address Indicator | | | | | |
| 2 | Calling Party No. Incomplete Indicator | Numbering Plan Indicator | | | Address Presentation Restricted Ind. | | Screening Indicator | |
| 3 | 2nd Address Signal | | | | 1st Address Signal | | | |
| ⋮ | | | | | | | | |
| n | Filler (if necessary) | | | | nth Address Signal | | | |

150

130

ANONYMOUS CALL REJECTION OVERRIDE

BACKGROUND OF THE INVENTION

1. Technical Field of the Invention

The present invention relates to a telecommunications network and, in particular, to a subscriber feature within such a network for overriding an anonymous call rejection capability associated with a terminating subscriber.

2. Description of Related Art

A number of advanced subscriber features are provided within a Signaling System No. 7 (SS7) telecommunications network to telecommunications subscribers. With the capability to transport data other than mere voice, advanced subscriber features like a Calling Party Identification, CLASS Automatic Recall (CAR), and Anonymous Call Rejection (ACR) are available. From the contents of an Integrated Service User Part (ISUP) call setup signal, a terminating subscriber is able to determine the directory number or name associated with an originating subscriber before answering a call. Furthermore, in cases where the originating subscriber refuses to disclose the subscriber identity in the setup signal, the Anonymous Call Rejection (ACR) feature denies the requested call setup and no incoming call connection is established.

There are, however, certain instances where an individual needs to effectuate a call connection with a particular subscriber without disclosing the directory number associated therewith. As an illustration, most medical professionals utilize an answering service for providing nonbusiness hour medical assistance. Patients are instructed to call the answering service, describe their symptoms, and if appropriate, the doctor is then paged by the answering service. The doctor may then establish a call connection with the patient and provide any necessary medical services. In order to maintain their privacy and to prevent the patient from directly calling back the doctor, medical professionals typically do not want to disclose their associated directory numbers while establishing a call connection with the patient. The answering service is instead preferred to be utilized as a focal point for receiving and screening all incoming calls. Accordingly, the directory number associated with the doctor is not disclosed or specified as a private number within the transmitted call setup signal. However, if the patient has the ACR feature active, the call connection request is accordingly denied due to the doctor's refusal to disclose his or her identity.

Therefore, for certain emergency situations, there is a need for a mechanism to enable a calling party subscriber to override the anonymous call rejection feature associated with the called party subscriber.

SUMMARY OF THE INVENTION

A method and apparatus for overriding an Anonymous Call Rejection (ACR) subscriber feature associated with a called party subscriber is disclosed. An Integrated Service Digital Network User Part (ISUP) call setup signal, such as an Initial Address Message (IAM), includes a calling party parameter indicating that the requested call connection is an emergency call connection. The transmitted IAM signal further instructs the end office serving the called party subscriber not to disclose the directory number associated with the calling party subscriber to the called party subscriber.

After receiving the call setup request signal, the end office serving the called party subscriber ascertains whether the called party subscriber has the ACR subscriber feature activated. In response to an affirmative determination, the end office then evaluates the included calling party parameter to ascertain whether the requested call connection is an emergency call connection. In case of an emergency call connection, the associated ACR subscriber feature is overridden and a call connection with the called party subscriber is effectuated without disclosing the calling party directory number. A CLASS Automatic Recall (CAR) subscriber feature associated with the called party subscriber is further deactivated to prevent the called party subscriber from automatically effectuating a recall connection with the calling party subscriber.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
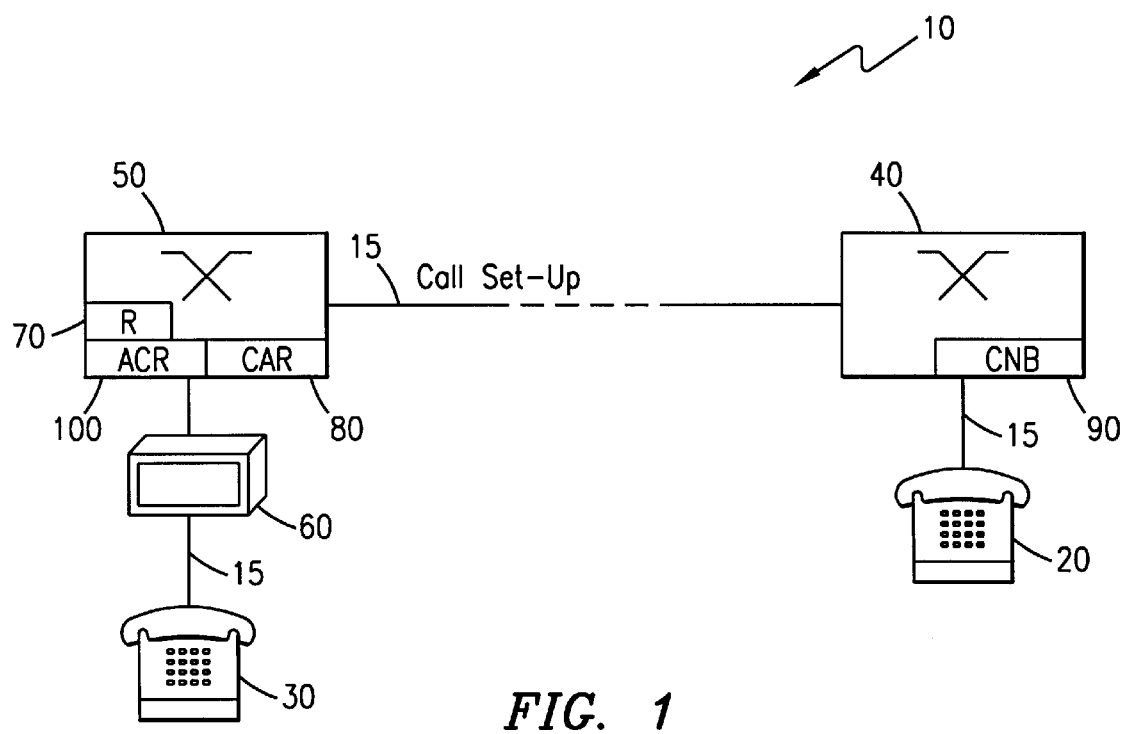
FIG. 1 is a block diagram of a telecommunications network illustrating a call connection between a calling party terminal and a called party terminal.

FIG. 1 is a block diagram of a telecommunications network 10 illustrating the establishment of a call connection 15 between a first subscriber terminal 20 and a second subscriber terminal 30. With the introducing of a Common Channel Signaling (CCS) telecommunications network, such as a Signaling System No. 7 (SS7) network, a number of advanced subscriber features are provided to subscribers. These advanced features are available because the serving telecommunications network is able to transport data other than mere voice between the two serving end offices. For example, with the introduction of Integrated Service Digital Network User Part (ISUP) signals, the calling party directory number is transported from an originating end office 40 serving the originating subscriber (associated with a first subscriber terminal 20 and also referred to as a calling party subscriber) to a terminating end office 50 serving the terminating subscriber (associated with a second subscriber terminal 30 and also referred to as a called party subscriber). The transported directory number is then displayed on a customer premises equipment (CPE) 60, such as a caller id display unit, attached to the second subscriber terminal 30.

The received directory number representing the originating subscriber is further stored at a register (R) 70 associated with the terminating end office 50. Thereafter, in response to an indication from the terminating subscriber to re-establish a call connection with the originating subscriber, an application module 80 associated with a CLASS Automatic Recall (CAR) subscriber feature retrieves the stored directory number from the register (R) 70 and automatically establishes a call connection with the associated first subscriber terminal 20. Accordingly, there is no need for the terminating subscriber to remember or to dial the directory number representing the originating subscriber associated with the lastly received incoming call connection. For each incoming call, the register (R) 70 is similarly updated with the associated directory number.

In order to respect one's privacy and desire to remain anonymous, an originating subscriber further has an option of blocking the displaying of the associated directory number to the terminating subscriber. For example, the user dials a service code before dialing a destination directory number indicating to the serving end office 40 not to disclose the associated directory number. A Calling Number Blocking (CNB) application module 90 associated with the serving end office 40, in turn, places an indication within a transmitted ISUP signal to instruct the destination end office 50 not to display the associated directory number. Furthermore, the register (R) 70 is not updated with the directory number representing the originating subscriber so as to disable the CLASS Automatic Recall (CAR) subscriber feature associated with the called party subscriber.

In order to similarly protect the terminating subscriber's privacy, a subscriber feature known as an Anonymous Call Rejection (ACR) feature has been introduced. In case an originating subscriber is refusing to disclose the associated directory number as described above, an ACR application module 100 rejects the received call setup signal. As a result, the call setup attempt fails and the originating subscriber is accordingly informed of the failure.

Figure 2:
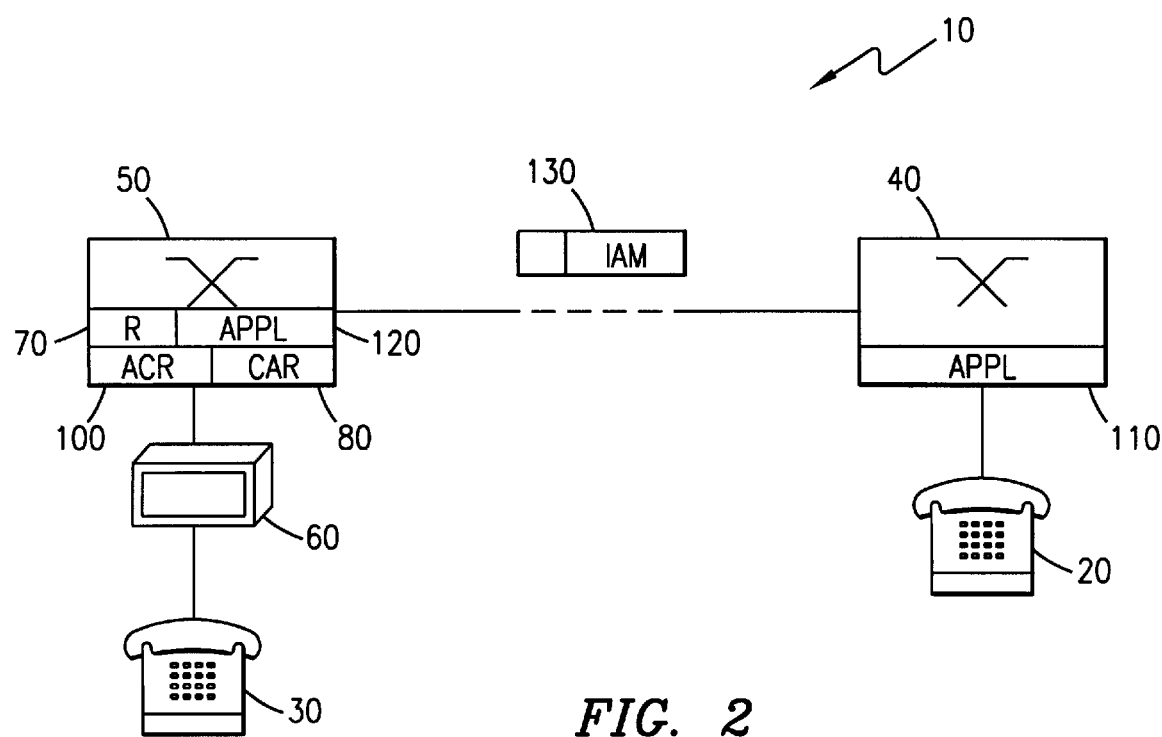
FIG. 2 is a block diagram of a telecommunications network effectuating an emergency call connection while overriding an Anonymous Call Rejection (ACR) subscriber feature associated with the called party subscriber in accordance with the teachings of the present invention.

FIG. 2 is a block diagram of a telecommunications network 10 effectuating an emergency call connection 140 while overriding the Anonymous Call Rejection (ACR) subscriber feature associated with the terminating subscriber in accordance with the teachings of the present invention. In order to protect the originating subscriber's directory number while still effectuating a call connection, an indication is included within an ISUP signal transmitted from the originating end office 40 toward the terminating end office 50. The originating subscriber, such as a doctor, indicates to the serving end office 40 a desire to remain anonymous while overriding any call barring features associated with the terminating subscriber. Such an indication may include a particular service code or function key. An application module 110 associated with the originating end office 40 then inserts a parameter within an ISUP call setup signal, such as an Initial Address Message (IAM) signal 130, indicating that this call setup requests an emergency call connection. The IAM signal 130 is then transmitted over the connected SS7 telecommunications network 10 toward the terminating end office 50.

After receiving the call setup request IAM signal 130, an application module 120 associated with the terminating end office 50 determines that a parameter or indicator has been set specifying the present call connection as an emergency call connection. Accordingly, regardless of whether the terminating subscriber has the Anonymous Call Rejection (ACR) 100 activated, the call is allowed to terminate towards the second subscriber terminal 30. Furthermore, the register (R) 70 for receiving and storing the calling party directory number associated with each incoming call connection is not updated with the originating subscriber's directory number. This is to disable the CLASS Automatic Recall (CAR) application module 80 from automatically effectuating a call back towards the first subscriber terminal 20.

The application module 120 further includes an indication within a transmitted Single Data Message Format (SDMF) to instruct the associated Customer Premise Equipment (CPE) 60 to display an appropriate message. The conventional SDMF message includes the date and time of the call, the calling line directory number if available, "P" if an anonymous or private incoming call is received, or "O" if an out-of-state/unavailable number is associated with the received incoming call connection. In accordance with the teachings of the present invention, a new parameter "E" is further included as one of the options within the transmitted SDMF message. The displayed "E" message informs the terminating subscriber that the incoming call connection is an emergency call and the calling party directory number is not available for display. The CPE 60 then displays "E" or "Emergency" on the display unit to inform the terminating subscriber of the nature of the call.

Figure 3:
FIG. 3 is a diagram illustrating the structure of an Initial Address Message (IAM) utilized for effectuating a call connection within a Signaling System No. 7 (SS7) telecommunications network.

FIG. 3 is a diagram illustrating the structure of an Initial Address Message (IAM) 130 utilized for effectuating a call connection within a Signaling System No. 7 (SS7) telecommunications network. In order to avoid altering or modifying the existing ISUP IAM signal structure, a spare value within the existing parameter is used. Presently, an Address Presentation Restricted Indicator parameter 150 within an IAM signal is used with following values:

TABLE 1

| Address Presentation Restricted Indicator (Octet 2) | |
| --- | --- |
| 00 | Presentation Allowed |
| 01 | Presentation Restricted (P) |
| 10 | Address not available (O) |
| 11 | Spare |

As illustrated above, the binary value "11" is currently not being used by the IAM parameter. In accordance with the teachings of the present invention, the binary value "11" is used to denote an emergency call connection where an originating subscriber is refusing to disclose the associated directory number. Accordingly, when the application module associated with a terminating end office receives the transmitted IAM signal, the application module evaluates the Address Presentation Restricted Indicator 150 and if the value is set to binary value "11", the associated ACR and CAR subscriber features are overridden and a call is allowed to be terminated towards the terminating subscriber. In order to ensure that only qualified subscribers are able to utilize the above function, each qualified subscriber may need to subscribe to a special subscriber feature enabling the subscriber to originate such an emergency call connection without disclosing the associated directory number.

For exemplary purposes, a wireline telecommunications end office is used to illustrate the present invention. However, as the system and method of the present invention are applicable to any node in a telecommunications network, such as a mobile switching center (MSC), it will be understood that the description of the present invention in the context of local end office provided herein is by way of explanation of the present invention rather than of limitation of the scope of the invention.

Furthermore, for exemplary purposes, inter-exchange communications between two different end offices are used to illustrated the present invention. However, the present invention is equally applicable for the establishment of an intra-call connection within a single telecommunications node. An internal signal analogous to an ISUP signal is instead communicated within a serving end office to effectuate an emergency call connection in accordance with the teachings of the present invention.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for establishing a call connection within a telecommunications network, said method comprising the steps of:

A) receiving a call setup request to establish a call connection with a particular terminal associated with a called party subscriber;

B) determining that a calling party subscriber associated with said call setup request is refusing to disclose the calling party subscriber's identity;

C) determining whether said called party subscriber has an Anonymous Call Rejection (ACR) feature activated; if no, D) establishing said call connection with said particular terminal; otherwise, E) determining whether said call setup request includes an Anonymous Call Rejection (ACR) feature override parameter; if no, F) denying said call setup request; otherwise, G) establishing said call connection with said particular terminal.

2. The method of claim 1 wherein said call setup request includes an Integrated Service Digital Network User Part (ISUP) based signal, and wherein said step E) further comprises the step of determining whether an Address Presentation Restricted Indicator parameter has been set within said received ISUP signal to override said ACR feature.

3. The method of claim 1 wherein said step G) further comprises the step of displaying a message to said called party subscriber that said associated ACR feature has been overridden.

4. The method of claim 1 wherein said step G) further comprises the step of disabling a CLASS Automatic Recall (CAR) subscriber feature associated with said called party subscriber for this particular incoming call.

5. A method for establishing a call connection within a telecommunications network, said method comprising the steps of:

receiving an indication from a calling party subscriber to effectuate an outgoing call connection as an emergency call connection towards a particular called party subscriber;

including a parameter within a call setup signal indicating that said call setup signal is for an emergency call connection and that a terminating end office serving said called party subscriber should not provide a directory number associated with said calling party subscriber;

transmitting said call setup signal requesting said emergency call connection towards said particular called party subscriber; and establishing said emergency call connection with said particular called party subscriber by overriding any called party subscriber call rejection feature that is based on a failure to provide the calling party directory number if the call setup signal includes the emergency call connection parameter.

6. The method of claim 5 further comprising the steps of:

receiving said transmitted call setup signal by an end office serving said called party subscriber;

determining that said received call setup signal is an emergency call connection by evaluating said included parameter; and establishing a call connection with said called party subscriber without displaying said directory number associated with said calling party subscriber.

7. The method of claim 6 wherein said incoming call barring subscriber feature includes an Anonymous Call Rejection (ACR) feature associated with said called party subscriber.

8. The method of claim 6 further comprising the step of further disabling a CLASS Automatic Callback (CAR) subscriber feature associated with said called party subscriber for said call connection.

9. The method of claim 7 wherein said step of establishing said call connection further comprises the step of informing said called party subscriber that said associated ACR feature has been overridden for said particular incoming call connection.

10. The method of claim 9 wherein said called party subscriber is associated with a Called Party Equipment (CPE) and wherein said step of informing said called party subscriber further comprises the step of transmitting data instructing said CPE to display "Emergency".

11. The method of claim 5 wherein said parameter includes an Address Presentation Restricted Indicator within an Integrated Service Digital Network User Part (ISUP) based call setup request signal.

12. The method of claim 11 wherein said Address Presentation Restricted Indicator Parameter includes the binary value of 11.

13. A telecommunications switch for establishing a call connection towards a particular terminal associated with a called party subscriber, comprising:

means for receiving a call setup request to establish a call connection with said terminal;

means for determining that said received call setup request is refusing to identify a calling party subscriber;

means for determining that said called party subscriber has an Anonymous Call Rejection (ACR) subscriber feature activated;

means for determining that said received call setup request includes an emergency call connection flag; and means for establishing said call connection with said particular terminal and overriding said ACR subscriber feature in response to a determination that said call setup request includes said emergency call connection flag.

14. The telecommunications switch of claim 13 wherein said received call setup request includes an Integrated Service Digital Network User Part (ISUP) based signal, and wherein said means for determining that said received call setup request includes said emergency call connection flag includes means for determining that an Address Presentation Restricted Indicator parameter within said ISUP based signal includes said flag.

15. The telecommunications switch of claim 13 further comprising means for displaying a message to said called party subscriber that said associated ACR has been overridden.

16. The telecommunications switch of claim 13 further comprising means for disabling a CLASS Automatic Recall (CAR) subscriber feature associated with s aid called party subscriber for said received incoming call connection.

17. A telecommunications node for establishing a call connection with a particular terminal associated with a called party subscriber, said called party subscriber associated with an Anonymous Call Rejection (ACR) subscriber feature for denying any incoming calls from an anonymous calling party subscriber, comprising:

a switch for receiving a call setup signal towards said terminal; and application module for determining that said received call setup signal is refusing to identify an associated calling party subscriber, said application module further comprising:

means for ascertaining whether said received call setup signal has an Anonymous Call Rejection (ACR) override flag set; and means for, in response to an affirmative determination, establishing a call connection with said called party subscriber without displaying a directory number associated with said calling party subscriber.

18. The telecommunications node of claim 17 wherein said call setup request signal comprises an Integrated Service Digital Network User Part (ISUP) based signal, said ISUP based signal including an Address Presentation Restricted Indicator parameter indicating whether said call setup signal has said CAR override flag set.

19. The telecommunications node of claim 17 wherein said application module further comprises means for disabling CLASS Automatic Recall (CAR) subscriber feature associated with said called party subscriber for said call connection.

20. The telecommunications node of claim 17 wherein said called party subscriber is equipped with a Calling Party Equipment (CPE) and wherein said application module further comprises means for instructing said CPE to display a message informing said called party subscriber that said associated ACR has been overridden for said call connection.

21. A method for establishing a call connection within a telecommunications network, said method comprising the steps of:

activating an incoming call barring feature for a particular called party subscriber;

receiving an indication from a calling party subscriber to effectuate an outgoing call connection as an emergency call connection towards said particular called party subscriber;

including a parameter within a call setup signal indicating that said call setup signal is for an emergency call connection and that a terminating end office serving said called party subscriber should not provide a directory number associated with said calling party subscriber;

transmitting said call setup signal requesting said emergency call connection towards said particular called party subscriber; and establishing said emergency call connection with said particular called party subscriber by overriding any called party subscriber call rejection feature that is based on a failure to provide the calling party directory number if the call setup signal includes the emergency call connection parameter.

* * * * *